(12) United States Patent
Bardin

(10) Patent No.: US 8,684,654 B2
(45) Date of Patent: Apr. 1, 2014

(54) WHEEL ASSEMBLY POSITIONING DEVICE

(75) Inventor: David A. Bardin, Bridgeton, MO (US)

(73) Assignee: Quality Stainless Products, Inc., Hazelwood, MO (US)

( * ) Notice: Subject to any disclaimer, the term of this patent is extended or adjusted under 35 U.S.C. 154(b) by 0 days.

(21) Appl. No.: 12/862,010

(22) Filed: Aug. 24, 2010

(65) Prior Publication Data

US 2012/0057954 A1   Mar. 8, 2012

(51) Int. Cl.
   *B66F 9/12*   (2006.01)
   *B66F 9/22*   (2006.01)

(52) U.S. Cl.
   USPC ........... 414/427; 187/231; 187/234; 187/237; 187/244

(58) Field of Classification Search
   USPC .......... 414/427; 187/224, 231, 233, 234, 237, 187/244, 253
   See application file for complete search history.

(56) References Cited

U.S. PATENT DOCUMENTS

| | | | |
|---|---|---|---|
| 1,361,909 A | | 12/1920 | Schoenknecht |
| 2,455,432 A | * | 12/1948 | Martin ........................ 187/253 |
| 2,883,003 A | | 4/1959 | Arnot |
| 2,977,092 A | | 3/1961 | Duerksen |
| 3,195,751 A | | 7/1965 | Meyers et al. |
| 3,727,781 A | | 4/1973 | Ramsey |
| 3,830,342 A | | 8/1974 | Allen |
| 3,957,137 A | | 5/1976 | Vermette |
| 4,051,970 A | | 10/1977 | Ramsey |
| 4,131,181 A | | 12/1978 | Vermette |
| 4,310,072 A | | 1/1982 | Davis |
| 4,374,550 A | | 2/1983 | Bartow |
| 4,458,785 A | | 7/1984 | Bushnell, Jr. |
| 4,496,031 A | | 1/1985 | Allen et al. |
| 4,571,142 A | * | 2/1986 | Niewald et al. ................ 414/427 |
| 4,593,791 A | * | 6/1986 | Matthews ...................... 187/226 |
| 4,684,310 A | * | 8/1987 | Stange .......................... 414/427 |
| 5,184,930 A | * | 2/1993 | Kuhn ............................ 414/427 |
| 5,330,032 A | | 7/1994 | Warner |
| 5,362,194 A | * | 11/1994 | Kassebaum ................... 414/427 |
| 5,505,578 A | * | 4/1996 | Fuller ........................... 414/427 |
| 5,820,330 A | | 10/1998 | Focke et al. |
| 6,343,674 B1 | | 2/2002 | Sexsmith |
| 6,929,442 B2 | | 8/2005 | Ferrari et al. |
| 7,478,704 B2 | | 1/2009 | Church |
| 7,611,126 B2 | * | 11/2009 | Vesa ........................... 254/93 H |
| 8,376,089 B2 | * | 2/2013 | Stone ........................... 187/232 |
| 2003/0221914 A1 | * | 12/2003 | Smith et al. .................... 187/244 |
| 2009/0045015 A1 | * | 2/2009 | Anstead et al. ................ 187/244 |
| 2011/0206487 A1 | * | 8/2011 | Morgan ......................... 414/427 |
| 2011/0243696 A1 | * | 10/2011 | DiBenedetto ................. 414/490 |

OTHER PUBLICATIONS

Blitz, Carrello per montaggio ruote Master Wheel 50, funzionamento con accumulatore, Jul. 2005, Blitz Rotary GmBH, Hufinger Strasse 55, D-78199 Braunlinger, Germany.

* cited by examiner

*Primary Examiner* — James Keenan
(74) *Attorney, Agent, or Firm* — Grace J. Fishel

(57) ABSTRACT

A wheel assembly positioning device. The device includes a wheel assembly cradle that holds a wheel assembly. A lifting device is also included that raises or lowers the wheel assembly cradle to allow a technician to dismount or mount a wheel assembly to a vehicle.

15 Claims, 3 Drawing Sheets

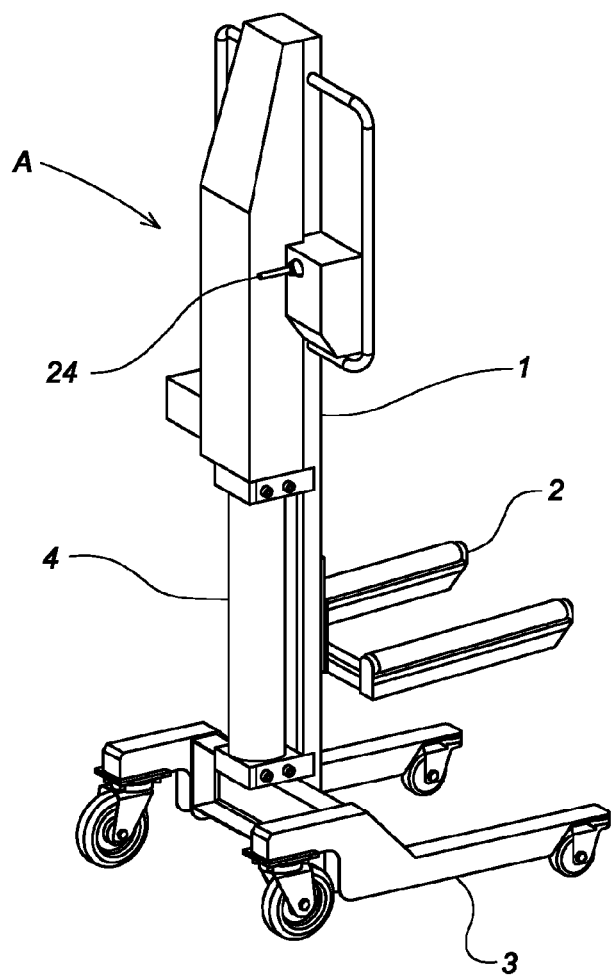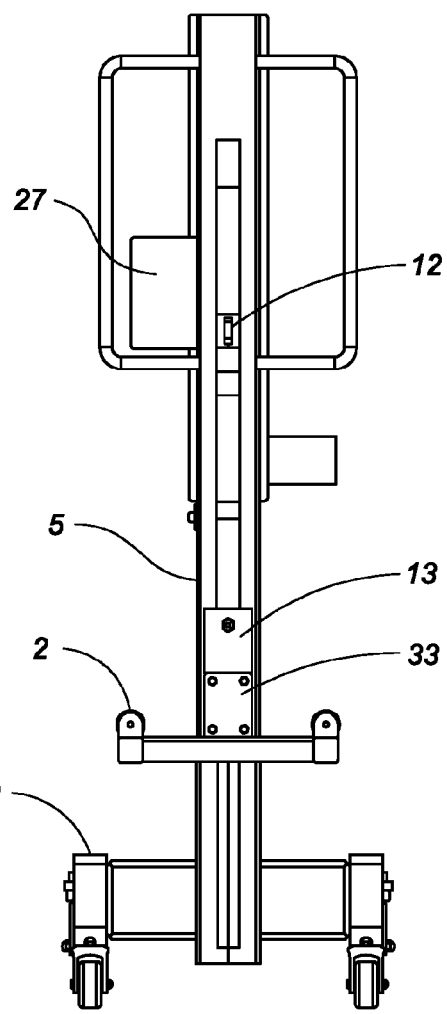

WHEEL ASSEMBLY POSITIONING DEVICE

STATEMENT REGARDING FEDERALLY SPONSORED RESEARCH

Not Applicable.

BACKGROUND

This section provides background information related to the present disclosure which is not necessarily prior art.

1. Field of Technology

The present disclosure relates to a wheel assembly positioning device that allows a maintenance technician to lower or raise a wheel assembly for dismounting and mounting of the wheel assembly to a vehicle.

2. Background of the Technology

Automotive maintenance often requires the dismounting and mounting of wheel assemblies. That process normally takes place after the vehicle has been raised several feet off the ground by a vehicle lift. Although raising the vehicle can provide better access to the vehicle during many maintenance procedures, the elevation of the vehicle above the floor upon can sometimes result in the maintenance technician being required to lift heavy objects such as, for example, wheel assemblies.

This situation occurs most often when the maintenance technician must remove a wheel assembly from the vehicle. In that case, the maintenance technician must remove the wheel assembly fasteners, lift the wheel assembly from the vehicle, and carefully place the wheel assembly upon the floor. The wheel assembly normally comprises a tire that is mounted upon a metal wheel and the metal wheel has a set of openings into which the wheel assembly fasteners can be placed to attach the wheel assembly to the vehicle. In many cases, the wheel assembly can be very heavy and can sometimes weigh two hundred pounds. Therefore, not only is it difficult for the maintenance technician to remove and lower the wheel assembly to the floor during dismounting of the wheel assembly, during remounting of the wheel to the vehicle the maintenance technician must lift the wheel assembly into a mounting position next to the vehicle and then carefully rotate the wheel assembly until the wheel assembly fastener mounting holes align with the matching component of the vehicle. This simultaneous lifting and aligning process can be slow and cumbersome, and can place severe strain on the maintenance technician that can result in serious injury to the technician or damage to the wheel assembly and vehicle.

It would be desirable to provide the maintenance technician with a tool that allows the technician to lower a wheel assembly, raise the wheel assembly, and then be able to rotate the wheel assembly to align and install the wheel assembly mounting fasteners without the technician being required to simultaneously carry the full weight of the wheel assembly. Additionally, it would be desirable to have such a tool that is relatively small and lightweight, and able to provide for quick downward and upward movement of the wheel assembly during dismounting and mounting of the wheel assembly.

BRIEF SUMMARY OF VARIOUS PREFERRED EMBODIMENTS OF THE INVENTION

This section provides a general summary of the disclosure, and is not a comprehensive disclosure of its full scope or all of its features.

In accordance with the various embodiments of the present invention, a new type of wheel assembly positioning device is disclosed herein that provides assistance to maintenance technicians who are dismounting and mounting wheel assemblies to automotive vehicles. The preferred embodiments of the wheel assembly positioning device as disclosed herein include a mobile pneumatic lifting assembly that can lower or lift a wheel assembly while also providing the ability to rotate the wheel assembly during mounting to align the wheel assembly fastener mounting openings. The design of the wheel assembly positioning device incorporates a novel double sheave—double acting design that results in quicker upward and downward movement of the wheel assembly while still maintaining a relatively compact tool.

The invention summarized above comprises the constructions hereinafter described, the scope of the invention being indicated by the subjoined claims. Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWINGS

In the accompanying drawings in which several of various possible embodiments of the invention are illustrated, corresponding reference characters refer to corresponding parts throughout the several views of the drawings in which:

FIG. 1 shows a front perspective view of one embodiment of the present invention;

FIG. 2 shows a front view of one embodiment of the present invention;

Corresponding reference numerals indicate corresponding steps or parts throughout the several figures of the drawings.

Figure 3:
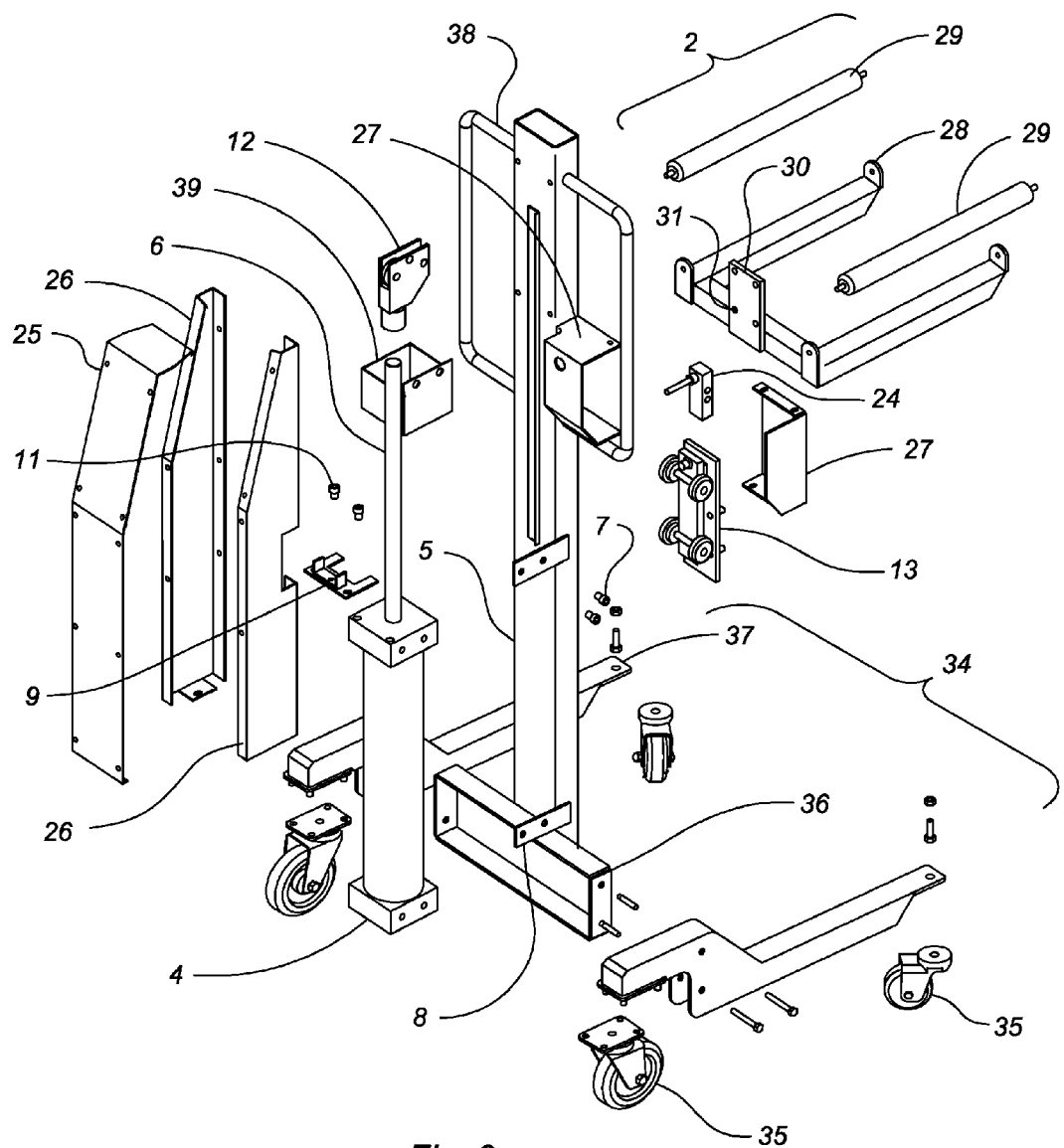
FIG. 3 shows an exploded view of one embodiment of the present invention.

The drawings described herein are for illustrative purposes only of selected embodiments and not all possible implementations, and are not intended to limit the scope of the present disclosure.

More specifically, although one embodiment of the present invention is illustrated in the above referenced drawings and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

Referring to the drawings more particularly by reference character, FIG. 1 discloses at least one preferred embodiment of a wheel assembly positioning device A. The wheel assembly positioning device A comprises a lifting assembly 1, a wheel assembly cradle 2, and a mobilizer carriage 3. The lifting assembly 1 is mounted onto the mobilizer carriage 3 to allow the wheel assembly positioning device A to be easily located within a work area where a wheel assembly is to be removed or installed. The wheel assembly cradle 2 is attached to the lifting assembly 1 and is the component upon which the wheel assembly is placed for upwardly and downwardly positioning by the wheel assembly position device A.

The lifting assembly 1 comprises a lifting device 4 that is mounted onto a lifting track 5 having front and rear aligned slots as seen in FIGS. 2 and 3. The lifting device 4 of the present embodiment is double-acting and includes a fluid chamber at each end of the lifting device that can be pressurized and depressurized to accomplish the raising or the lowering of the wheel assembly cradle 2. The lifting device 4 further comprises a rod 6 that generates a linear action in the lifting device when the fluid chambers in the lifting device are pressurized and depressurized. The lifting device 4 is attached to the lifting track 5 by installation of a set of fasteners 7 installed through two mounting brackets 8 mounted to the sides of the lifting track 5.

Figure 4:
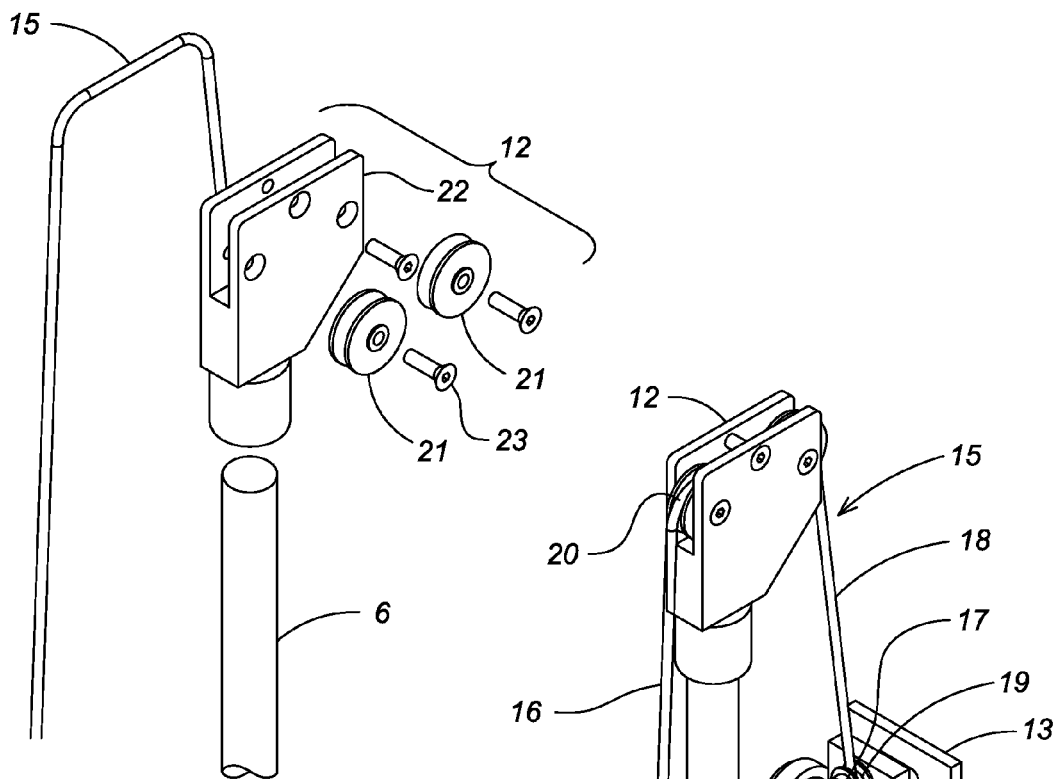
FIG. 4 shows an exploded view of the double sheave subassembly of one embodiment of the present invention.
Figure 5:
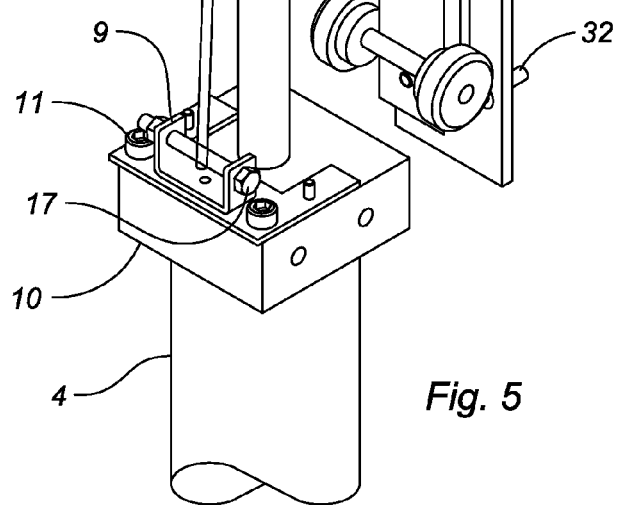
FIG. 5 shows a perspective view of a part of the lifting device in one embodiment of the present invention.

A clevis support 9 (FIG. 5) is mounted onto a proximal end 10 of the lifting device 4 with a second set of fasteners 11 and a sheave assembly 12 is mounted onto the rod 6 of the lifting device. The wheel assembly cradle 2 (FIG. 2) is mounted to a trolley assembly 13 (FIG. 5) that includes a set of wheels 14 that are attached to an underside of the trolley assembly and are designed, sized and configured to engage with portions of the lifting track 5 that guide the trolley assembly upwardly and downwardly within the lifting track. A cable assembly 15 is installed into the lifting assembly by attachment of a first end 16 of the cable assembly to the clevis support 9 with a fastener 17. A second end 18 of the cable assembly 15 is attached to the trolley assembly 13 at a trolley assembly attachment point 19. It is understood that an intermediate portion 20 of the cable assembly 15 is installed onto the sheave assembly 12 by placement of the intermediate end of the cable assembly into the grooves of the sheaves within the sheave assembly. The sheave assembly 12 (FIG. 4) includes two sheaves 21 mounted in a sheave holder 22 by a third set of fasteners 23.

It is understood by those of skill in the art that the attachment of the cable assembly 15 as shown and described above results in movement of the trolley assembly 13 upward when the rod 6 is extended from the lifting device 4. Conversely, the trolley assembly 13 moves downward when the rod 6 is retracted into the lifting device 4. It is also appreciated that the unique mounting style of the cable assembly 15 results in a difference of movement between the trolley assembly 13 and the movement of the rod 6 by a ratio of 2:1. That is to say, for every increment the rod assembly is extended from the lifting device 4, the trolley assembly 13 moves upward two increments. In the present embodiment, this specifically means that for every one inch increment the rod 6 either retracts or extends, the trolley assembly 13 moves two inches downward or upward respectively. As a result, the wheel assembly lifting device A provides quick positioning and repositioning of the trolley assembly 13 to move any wheel assembly resting upon the wheel assembly cradle 2 while using a relatively compact lifting device 4. Thus, the lifting assembly 1 of the present embodiment offers maintenance technicians a tool for lifting wheel assemblies quickly without the need for a larger and more cumbersome lifting mechanism.

The movement of rod 6 within the lifting device 4 and the resulting movement of the trolley 13 are controlled by a control switch 24. The control switch 24 in the present embodiment is a four-way, three position fluid control switch in which a first position communicates a flow of fluid to the lifting device 4 to extend the rod 6 from the lifting device. A second position communicates a flow of fluid to the lifting device 4 to retract the rod 6 into the lifting device. Finally, a third position is a neutral position the does not communicate any flow of fluid to the lifting device 4 and, therefore, retains the vertical location of the trolley assembly 13 on the lifting track 5. By manipulating the position of the control switch 24, the maintenance technician controls the upward movement, the downward movement, and the static position of the wheel assembly cradle 2 and that allows the technician to position the wheel assembly at whatever location that provides the least effort for the technician to dismount or mount the wheel assembly onto the vehicle being maintained.

In the current embodiment, the fluid used in the lifting assembly 1 is air, the control switch 24 is a pneumatic valve, and the lifting device 4 is a double acting pneumatic cylinder. Compressed air is supplied to the wheel assembly positioning device A by a compressed air line that is attached to a quick disconnect fitting disposed on a control switch cover 27. Use of the quick disconnect fitting enhances the general portability of the wheel assembly positioning device A by allowing the device A to be connected to any available compress air source and by not including a dedicated air tank mounted onto the device A.

It will be appreciated by those of skill in the art that other types of fluid may also be used. For example, in other embodiments, the fluid may be an oil based fluid, the control switch 24 may by hydraulic, and the lifting device 4 may be a double acting hydraulic cylinder. In yet other embodiments of the present invention, the lifting assembly 1 can comprise an electric motor as the lifting device 4 and electrical switches as the control switch 24. In fact, any technology may used in the lifting device 4 as long as the technology used is capable of manipulating a wheel assembly having a weight of at least two hundred pounds, can raise the wheel assembly, can lower the wheel assembly, can retain the wheel assembly at a static position as desired by a maintenance technician, and can provide a maintenance technician with the ability to control the upward and downward movement of the wheel assembly cradle 2.

To protect certain components of the lifting assembly 1, the lifting assembly comprises a back cover 25 (FIG. 3) and two side covers 26. The two side covers 26 are attached to a back side of the lifting track 5 and the back cover 25 is then attached to each of the two side covers. As a result, the moving components of the lifting assembly 1 are not exposed to the maintenance technician and this reduces potential injury to the technician. The control switch cover 27 is used for mounting the control switch 24 and to also protect the control switch from damage. Additionally, the front cover 25, the side covers 26, and the control switch cover 27 protect the cable assembly 15, the lifting device 4, and other components of the lifting assembly 1 from damage that might result from striking those components with foreign objects.

The wheel assembly cradle 2 comprises a frame 28, two tire rollers 29, and a mounting bracket 30. Each of the two tire rollers 29 are rotatably attached onto the frame 28 in a manner that allows the tire rollers to rotate in a clockwise or counter-clockwise direction. The mounting bracket 30 is attached to the frame 28 and has a plurality of openings 31 sized and located to match a set of mounting studs 32 on an upper side the trolley assembly 13. When the lifting assembly 1 is fully assembled, the wheel assembly cradle 2 is mounted onto the trolley assembly 13 with a fourth set of fasteners 33. It is understood that in other embodiments of the present invention, the tire rollers 29 may be replaced with other devices that may be necessary for access and manipulation of a wheel assembly, or in applications that require movement of objects other than wheel assemblies. For example, in other embodiments, the tire rollers 29 may be replaced with cables, ropes, or hook and chain assemblies. In yet alternative embodiments, the device A can be further modified to have a flat platform for lifting objects such as storage cabinets into position for installation onto wall surfaces, or to allow objects placed on the flat platform to be slid onto shelve assemblies already installed.

The mobilizer carriage 3 includes a mobilizer frame 34 and a plurality of wheels 35. In the present embodiment, all four of the plurality of wheels 35 are swivel caster wheels and the two wheels generally inline with the lifting track 5 are lockable to increase the general stability of the wheel assembly positioning device A during use. The mobilizer frame 34 includes a base frame 36 and two wheel frames 37 mounted to each side of the base frame as shown in FIG. 3. It will be appreciated that the two wheel frames 37 are mounted to the base frame 36 with removable fasteners. Therefore, in certain shipping situations, the removable fasteners can be removed and the two wheel frames 37 can be packaged with the remainder of the components of the wheel assembly positioning device A to result in a smaller shipping package to reduce shipping costs. The assembled mobilizer carriage 3 is attached to the lower portion of the lifting track 5. The plurality of wheels 35 is generally located at each of the four corners of the mobilizer frame 34 to provide stability to the wheel assembly positioning device A during use.

To ease in the relocation of the wheel assembly positioning device A within a workshop area, two handles 38 are mounted to an upper portion of the lifting track 5. It is noted that the size and configuration of the two handles 38 allow the maintenance technician to reach through the two handles to gain access to the wheel assembly when the technician is standing behind the wheel assembly positioning device A.

In operation, the maintenance technician positions the wheel assembly positioning device A such that the wheel assembly cradle 2 faces the wheel assembly to be removed from a vehicle, and the vertical centerline of the wheel assembly cradle is in general alignment with the center line of the wheel assembly on the vehicle. Compressed air is supplied to the wheel assembly positioning device A by attaching available compress air to the quick disconnect fitting on the control switch cover 27. The control switch 24 is activated to allow the lifting device 4 to move the wheel assembly cradle 2 upward (or downward as necessary) until the tire rollers 29 of the wheel assembly cradle are at an elevation just below the bottom circumference of the wheel assembly on the vehicle. The technician releases the control handle of the control switch 24 to allow the control switch to return to a neutral position that tends to hold the wheel assembly cradle 2 at a fixed height. The maintenance technician pushes the wheel assembly positioning device A toward the wheel assembly until the tire rollers 29 are beneath the wheel assembly.

Using proper tools, the maintenance technician then removes each of the lug nuts holding the wheel assembly onto the vehicle and can optionally place the lug nuts into the lug nut storage container 39 mounted onto the lifting track 5. After all lug nuts are removed, the technician pulls the wheel assembly from the vehicle and allows the wheel assembly to rest upon the tire rollers 29 of the wheel assembly cradle 2. The wheel assembly positioning device A is then moved away from the vehicle until the wheel assembly can be lowered without interference between the vehicle and the wheel assembly. The technician then activates the control switch 24 to allow the wheel assembly cradle 2 to lower. When the wheel assembly cradle 2 is low enough to allow the wheel assembly to be safely removed from the wheel assembly cradle, the technician releases the control switch 24 to allow the control switch to return to a neutral position that tends to hold the wheel assembly cradle 2 at a fixed height.

When the maintenance technician is ready to install the wheel assembly back onto the vehicle, the previous procedure is generally reversed. It is noted, however, the preferred embodiments of the wheel assembly positioning device A include rotatable tire rollers 29 that allow the maintenance technician to rotate the wheel assembly after it has been positioned in general vertical alignment with the hub of the vehicle upon which the wheel is being mounted. This allows the technician to easily align the wheel assembly mounting fasteners with the wheel assembly fastener openings without having to manually and simultaneously carry the dead weight of the wheel assembly. Those of skill in the art will appreciate that use of preferred embodiments of the wheel assembly positioning device A greatly reduce the dead weight that must be lifted, carried, and positioned by the maintenance technician during dismounting and remounting of the wheel assembly to the vehicle.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

Additionally, it will be seen in the above disclosure that the several intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "connected," "coupled," "engaged," or "engageable" to and/or with another element, it can be directly connected, coupled, engaged, engageable to and/or with the other element or intervening elements may be present. In contrast, when an element is referred to as being "directly connected,"

"directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed:

1. A wheel assembly positioning device comprising:
   a wheel assembly cradle capable of lifting an object mounted on a hollow generally rectangular mast with front and rear aligned slots and smooth inner walls comprising a lifting track;
   a trolley operatively connected to the cradle;
   said trolley having an underside mounted for reciprocation up and down the lifting track on two pairs of wheels that are attached to the underside of the trolley and are designed, sized and configured to engage with portions of the lifting track to guide the trolley upwardly and downwardly within the lifting track;
   said cradle comprising a frame, two tire rollers, and a mounting bracket by which it is attached to an upper side of the trolley outside the front slot, wherein each of the two tire rollers is rotatably attached in a manner that allows the tire rollers to rotate in a clockwise or counterclockwise direction;
   a cable lifting assembly operatively connected to the trolley through the rear slot wherein the lifting assembly includes a lifting device that moves the trolley at a ratio of about 2:1 such that the trolley moves substantially vertically at about two increments for every one increment the lifting device moves;
   said cable lifting assembly having a single point attachment to an upper end of the trolley between an upper of the two pairs of wheels;
   said trolley suspended by the cable lifting assembly in the lifting track; and
   a mobilizer carriage.

2. The wheel assembly positioning device of claim 1 wherein the lifting device is double acting and includes a fluid chamber at each end of the lifting device that can be pressurized and depressurized to accomplish the raising or the lowering of the wheel assembly cradle.

3. The wheel assembly positioning device of claim 2 wherein the lifting device further comprises a rod that generates a linear action in the lifting device when the fluid chambers in the lifting device are pressurized and depressurized.

4. The wheel assembly positioning device of claim 3 wherein the lifting device is attached to the lifting track by installation of a set of fasteners installed through two mounting brackets mounted to the sides of the lifting track.

5. The wheel assembly positioning device of claim 4 further comprising a sheave assembly mounted onto the rod of the lifting device.

6. The wheel assembly positioning device of claim 5 further comprising a clevis support mounted onto a top end of the lifting device.

7. The wheel assembly positioning device of claim 6 further comprising a cable assembly that is installed into the lifting assembly by attachment of a first end of the cable assembly to the clevis support and attachment of a second end of the cable assembly to the trolley, and an intermediate portion of the cable assembly that is installed onto the sheave assembly by placement of the intermediate portion of the cable assembly into the groove of a sheave within the sheave assembly.

8. The wheel assembly positioning device of claim 7 wherein the sheave assembly includes two sheaves serially operatively mounted in a sheave holder.

9. The wheel assembly positioning device of claim 8 wherein the lifting device is fluid operated and is controlled by a control switch that is four-way fluid control switch having at least three control positions that can operatively bias the trolley at least one of either upward, downward, or to remain in a fixed position.

10. The wheel assembly positioning device of claim 9 wherein the lifting assembly is one of either pneumatic, hydraulic, or electrical.

11. The wheel assembly positioning device of claim 10 wherein the mobilizer carriage comprises a mobilizer frame, a base frame, two wheel frames mounted to each side of the base frame, a first set of wheels, and a second set of wheels wherein at least one of either the first set of wheels or the second set of wheels is one of either a swivel wheel or a lockable wheel.

12. The wheel assembly positioning device of claim 11 further comprising two handles mounted to an upper portion of the lifting track.

13. A wheel assembly positioning device comprising:
    a wheel assembly cradle capable of lifting an object mounted on a hollow generally rectangular mast with front and rear aligned slots and smooth inner walls comprising a lifting track wherein the wheel assembly cradle is mounted onto a trolley having an underside with two pairs of wheels that are designed, sized, and configured to engage with portions of the lifting track to guide the trolley upwardly and downwardly within the lifting track, and wherein the wheel assembly cradle comprises a frame, two tire rollers, and a mounting bracket attached to an upper side of the trolley outside the front slot, wherein each of the two tire rollers is rotatably attached onto the frame in a manner that allows the tire rollers to rotate in a clockwise or counterclockwise direction;
    a cable lifting assembly operatively connected to the trolley through the rear slot with a single point attachment to an upper end of the trolley between an upper of the two pairs of wheels wherein the lifting assembly includes a lifting device that moves the trolley at a ratio of about 2:1 such that the trolley moves substantially vertically at about two increments for every one increment the lifting device moves, said trolley suspended by the cable lifting assembly in the lifting track, wherein the cable lifting device is double-acting and includes a fluid chamber at each end of the lifting device that can be pressurized and depressurized to accomplish the raising or the lowering of the wheel assembly cradle and the lifting device includes a rod that generates a linear action in the lifting device when the fluid chambers in the lifting device are pressurized and depressurized, and wherein a clevis support is mounted onto a proximal end of the lifting device;
    a control switch that is four way fluid control switch having at least three control positions that can operatively bias the trolley assembly to at least one of either move upward, move downward, or remain in a fixed position; and,
    a mobilizer frame comprising a base frame, two wheel frames mounted to each side of the base frame, a first set of wheels, and a second set of wheels wherein at least one of either the first set of wheels or the second set of wheels is one of either a swivel wheel or a lockable wheel.

14. The wheel assembly positioning device of claim 13 further comprising a sheave assembly mounted onto the rod of the lifting device wherein the sheave assembly includes two sheaves serially operatively mounted to a sheave holder.

15. The wheel assembly positioning device of claim 14 further comprising a cable assembly that is installed into the lifting assembly by attachment of a first end of the cable assembly to the clevis support and attachment of a second end of the cable assembly to the single point attachment to the trolley, and an intermediate portion of the cable assembly that is installed onto the sheave assembly by placement of the intermediate portion of the cable assembly into the groove of a sheave within the sheave assembly.

* * * * *